United States Statutory Invention Registration [19]

[11] Reg. Number: H614

Norman, Sr.

[43] Published: Apr. 4, 1989

[54] METHOD TO CONNECT DRILL HOLES UTILIZING SIGNALLING DEVICES

[76] Inventor: Robert R. Norman, Sr., P.O. Box 1300, Moab, Utah 84532

[21] Appl. No.: 203,088

[22] Filed: Sep. 19, 1988

[51] Int. Cl.[4] ..... E21C 41/08; E21C 41/14

[52] U.S. Cl. ..... 299/4; 175/45; 175/61; 299/5; 299/16; 405/58

[56] References Cited

U.S. PATENT DOCUMENTS

| | | | |
|---|---|---|---|
| 2,850,270 | 9/1958 | Hauson | 299/4 |
| 2,861,428 | 11/1958 | Hendrix | 299/4 |
| 2,880,587 | 4/1959 | Hendrix et al. | 405/58 |
| 3,003,557 | 10/1961 | Huitt et al. | 166/271 |
| 3,058,730 | 10/1962 | Bays | 299/4 |
| 3,223,158 | 12/1965 | Baker | 299/4 |
| 3,329,207 | 7/1967 | Shock et al. | 299/4 |
| 3,405,974 | 10/1968 | Hundley et al. | 299/4 |
| 3,433,530 | 3/1969 | Dahms et al. | 299/4 |
| 3,941,422 | 3/1976 | Henderson | 299/5 |
| 4,249,777 | 1/1981 | Morrell et al. | 299/4 |

*Primary Examiner*—David H. Brown

[57] ABSTRACT

This is a method to connect two or more drill holes, such as drill holes at distances of 2,000 to 5,000 feet or more apart, for the purpose of producing soluble ores, such as sylvanite or carnallite, from thick, deep ore bodies or from thin, shallow ore bodies. The drill holes are connected utilizing a signal-sending device in an initial drill hole and a signal-receiving device in a subsequent drill hole. A fluid is injected down one of the holes forcing the effluent from the other hole thus forming a mined-out corridor between the two holes. This procedure can then be repeated with subsequent, offset drill holes.

19 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIGURE NO. 1
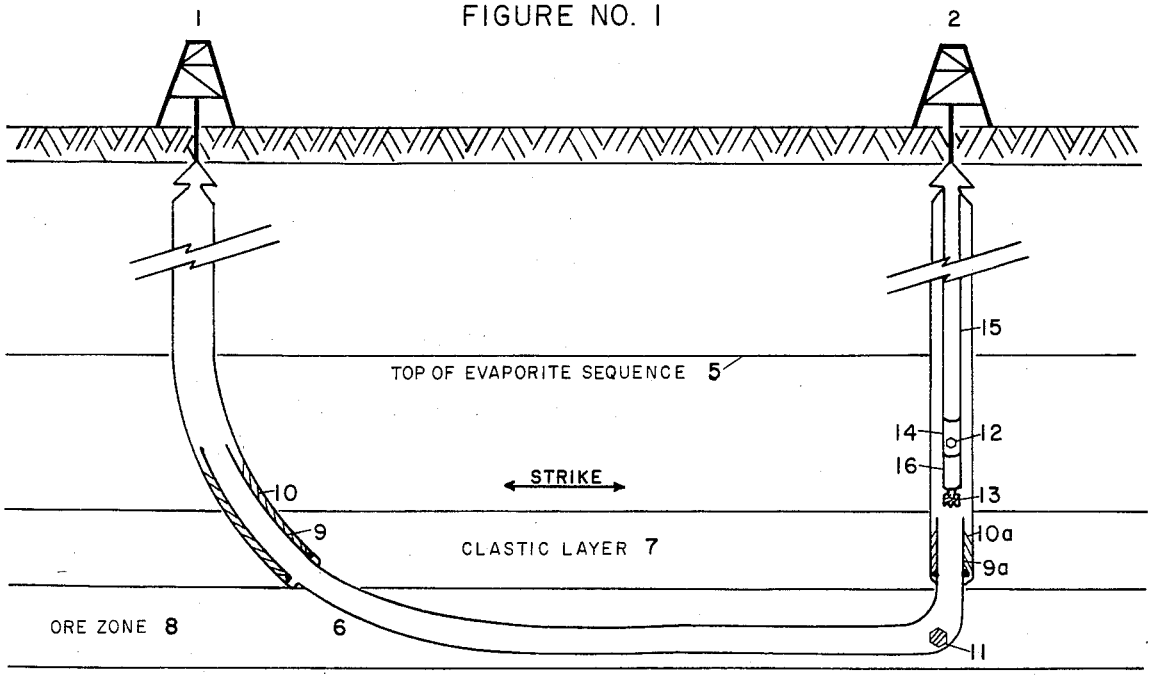
FIGURE NO. 2
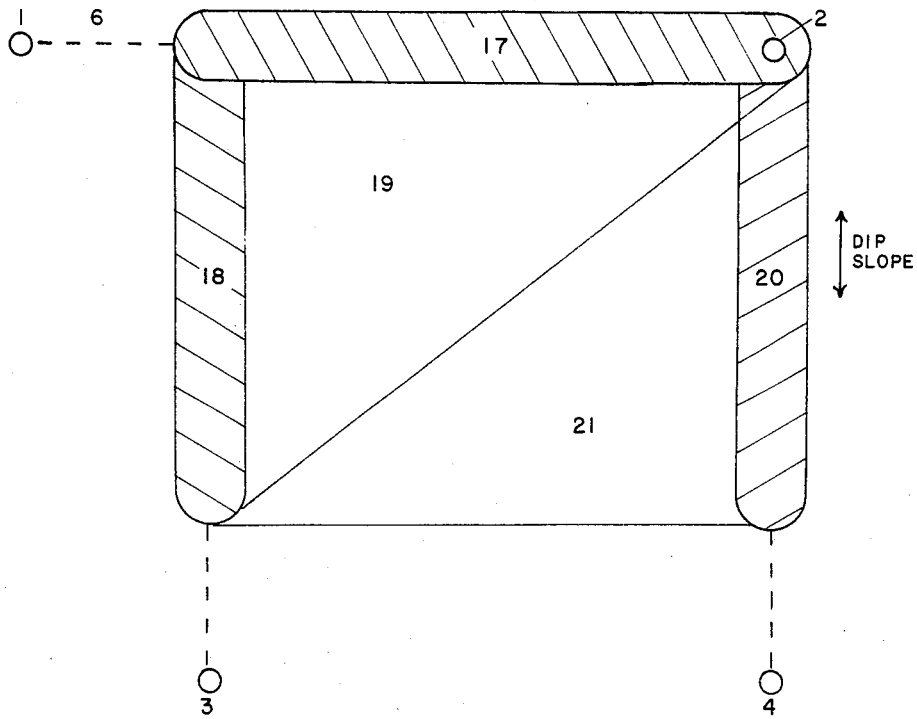

METHOD TO CONNECT DRILL HOLES UTILIZING SIGNALLING DEVICES

BACKGROUND OF THE INVENTION

This invention is in the field of recovery of soluble, evaporite ore by solution mining between two or more drill holes. More particularly, it involves an efficient method to connect drill holes that recovers a larger proportion of the soluble ore in the ore body than previously recovered by prior art. One basic method involving more than one hole is to drill two conventional, vertical holes into a soluble ore layer. Solution mining is employed in each drill hole creating cavities in the existing ore body. Oil is then introduced into each cavity forming an insoluble pad in the cavity's upper surface and forcing the rapid formation of a flattened cavity. The flattened cavities grow in size until they join together. The formation can then be mined by pumping fresh water into one drill hole and removing saturated ore solution from the other drill hole. Using this method, both drill holes must be completed for individual mining operations and the process to achieve coalescence is slow.

Another method is to drill two conventional, vertical holes spaced a distance apart from each other. One or both of the drill holes is fractured using a high pressure procedure frequently employed by the petroleum industry. If the fracture procedure opens a passageway between the two drill holes, water can then be pumped down one drill hole and saturated ore solution can be removed from the other drill hole. In this method there is no way to control the direction of fracture. Therefore, to insure success, the holes must be drilled closely together. Even if the holes are drilled closely enough together to connect by fracturing, the resulting cavity formation is small and the total saturated ore recovery is diminished.

Still another method is to locate the positions at which two holes spaced a distance apart from each other can be drilled down to the soluble ore body. One of the holes is drilled vertically (conventionally). The other hole is drilled from a point on the surface at a selected distance. This hole is deflected as it is drilled in the direction of the conventional hole. The base of the deflected drill hole then approaches the base of the conventional drill hole. The soluble ore body is fractured by the force from a liquid under high pressure, such as a saturated salt solution, injected down one or both drill holes to obtain a fissure tying together the bases of the two drill holes. If the fracture attempt is unsuccessful, the deflected hole is drilled further toward the bottom of the conventional hole. One or both of the drill holes is again fractured to obtain interconnection. If interconnection is not achieved, the drill holes are individually solution mined to form cavities. When the cavities grow until they join, the soluble ore body is mined by pumping fresh water down one drill hole thereby forcing saturated ore solution out of the other drill hole.

Another disadvantage of these previous methods of connecting two holes is that more holes must be drilled to extract soluble ore from a given area than in the present invention, thereby adversely affecting the economics of the procedure. The present invention results in fewer drill holes, more accurate connection of said drill holes and ore recovery from a larger area of a mineral-bearing stratum resulting in lower, overall production costs than the prior art.

SUMMARY OF THE INVENTION

The present invention is a method to economically solution mine thick, deep, soluble ore bodies or thin, shallow ore bodies from two or more drill holes located at the surface a distance of 2,000 to 5,000 feet or more apart. The depths of these soluble ore bodies are normally too far beneath the surface to be mined conventionally, such as by sinking a shaft and sending men underground. If the formation is at a shallow depth, the ore zone may be too thin to mine conventionally.

First, the upper portion of the initial hole is drilled vertically (conventionally) to the top of the evaporite sequence. The lower portion of the drill hole is then deflected in the direction of the strike of the ore zone with the use of a deflecting motor. When the drill bit reaches the lower part of the closest, clastic layer overlying the ore zone, casing is run and cemented. A smaller drill bit and deflecting motor that fit the smaller size of the casing are attached to the drill pipe and deflected drilling continues to carry the drill hole to a horizontal position and reach a distance of an additional 1,000 to 5,000 feet or more. A signal-sending device is then placed at the end of the first drill hole.

The location of the second drill hole is surveyed in on the surface at a point that is precisely vertical from the signal-sending device in the first drill hole. The second hole is drilled vertically (conventionally). When the top of the evaporite sequence is reached, the drill pipe is pulled in order to place a signal-receiving device in a non-magnetic section of drill pipe immediately behind the drill sub and bit. The drill pipe is placed back in the second drill hole whereupon the signalling device in this second drill hole picks up the signal from the signalling device in the first drill hole. Monitoring-while-drilling instrumentation guides the drill bit to the base of the closest, clastic layer directly above the signal-sending device in the first drill hole. The second drill hole is cased to total depth and cemented. A smaller drill bit is attached to accommodate the smaller size of the cased hole, and further drilling results in the connection of the two holes. If interconnection is not achieved, the two drill holes are joined by dissolving a cavity in the ore zone at the base of the second drill hole to reach the base of the first drill hole.

The soluble ore is then mined between the two drill holes by injecting water down one drill hole and withdrawing saturated ore solution from the other drill hole. To insure a symmetrical cavity in the ore body, the direction of the influent is periodically reversed between the two drill holes. The size of the cavity can be controlled by adjusting the level of an in-place petroleum blanket or nitrogen or normal air pad which is also useful in preventing the upward dissolution of any halite located between the ore zone and the overlying, insoluble clastic layer. The position of the pad or blanket is maintained deep in the ore zone during the early stages of the dissolution process so that the desired width of the cavity can be attained and controlled.

Should dissolution of ore need to be accelerated for any reason such as to control cavity width, the brine level in the cavity can be adjusted for a short interval to a point below the roof of the ore body and unsaturated water can be run along the saturated, fluid surface beneath the exposed ore roof. The brine can then be returned to its original level. This method can also be utilized to selectively dislodge small portions of interbedded sodium chloride crystals particularly when mining lower grade sylvinite ore. As the sodium chloride is dislodged and falls to the floor of the cavity, the potassium and/or magnesium chloride to sodium chloride ratio can be improved in the effluent.

A third hole can be located at a point that will allow the previous corridor to be extended or it can be positioned at a right angle to the cavity created in the ore body by the first two drill holes. When connection is made to a third drill hole and a corridor is established, the dissolution process can continue to mine out a triangular area among the three drill holes. If the third drill hole is located up-dip from the first two drill holes, the third drill hole becomes the influent drill hole. If the third drill hole is located down-dip from the original, two drill holes, the third drill hole becomes the effluent or production drill hole. This procedure is necessary due to the increase of specific gravity of the brine as it becomes more saturated with the dissolved ore. A subsequent hole can be located and drilled to either further extend the previous corridor or to create a second triangle and thereupon complete a square or rectangular shaped cavity in the ore zone.

BRIEF DESCRIPTION OF THE DRAWINGS

FIG. 1 is a cross-sectional view of a solution mine in an intermediate stage according to the process of this invention. FIG. 2 is a plan view of a solution mine showing the expansion of this method according to the process of this invention.

DESCRIPTION OF THE PREFERRED EMBODIMENT

Referring to the drawing shown in FIG. 1, numeral 1 designates an initial, vertical hole drilled to the top of evaporite sequence 5. A deflecting motor begins to turn the lower portion of the drill hole until the base of the clastic layer 7 closest to the underlying, objective soluble ore zone 8 is reached. Casing 9 is set from the surface to the base of the clastic layer 7 and cemented 10, reducing the size of the drill hole 1. A smaller deflecting motor is attached to the drill pipe 15 and deflected drilling continues in ore zone 8 until drill hole 1 is in a horizontal position at or near point 6. This extended reach procedure is followed by pumping air or water as a circulation fluid through the drill pipe 15 and pushing the signal-sending device 11 to or near the end of the first drill hole 1. The location of the second drill hole 2 is then surveyed in on the surface at a point directly above the signal-sending device 11. This second hole 2 is drilled to a point at which communication with the in-place, signal-sending device 11 becomes possible. The signal-receiving device 12 is then placed in a nonmagnetic pipe 14 and attached to the drill pipe 15 behind the drill bit 13 or optional drilling sub 16. The drill bit 13, guided toward the signal-sending device 11 by the signal-receiving device 12, is steered by monitoring-while-drilling equipment which provides a surface readout of the location of the drill bit 13 so that directional adjustments can be made. Once a point near the base of the clastic layer 7 overlying ore zone 8 is reached, casing **9*a* is run and cemented 10*a*. The second drill hole 2 is then drilled to the base of ore zone 8 and accurately connects with the first hole 1. When interconnection is achieved between the first hole 1 and the second hole 2, injection of the influent commences at one of the holes and the effluent from ore zone 8 is recovered from the other hole. To control the size of the cavity, the direction of the influent is alternated between the two holes. Further, this "u-shaped" system of fluid input or influent and brine production output or effluent is not restricted to level ore zones but can be achieved by the same connecting procedure in dipping ore zones and/or expanded to include other, underlying ore zones; i.e., to produce from two zones separately or concurrently. After mining out an initial cavity or corridor 17 between two holes 1,2 as seen in FIG. 2, the procedure can be repeated to mine between two additional drill holes or to connect a new drill hole located at a right angle to the corridor 17 in ore zone 8 created by the first two holes 1,2 as follows. Drill and case a third hole 3, mine out the second corridor 18, mine out the first triangle 19, drill a fourth hole 4, mine out corridor 20 and finally, mine out the second triangle 21** to complete a square or rectangular shaped cavity.

The disclosure of the invention described hereinabove represents the preferred embodiments of the invention; however, variations thereof, in the form, sequence of holes, construction and arrangement of the various components thereof and the modified application of the invention are possible without departing from the spirit and scope of the claims herein.

What is claimed is:

1. A method of establishing accurate communication between drill holes in deep, thick or shallow, thin soluble ore bodies comprising the following steps:

a. drilling an initial hole to the top of the closest, overlying evaporite sequence to the ore zone, said hole then being deflected horizontally to reach the soluble ore zone;

b. drilling to a point at a distance of 1000 to 5000 feet or more from the point of deflection;

c. pushing a signal-sending device to the base of the said initial hole whereupon the position of the said signal-sending device can be surveyed in to establish the location of a second drill hole;

d. drilling a second hole to the position of the aforementioned signal-sending device in the initial hole utilizing a signal-receiving device positioned in the drilling apparatus in the second hole;

e. conjoining the bases of the drill holes.

2. The method and subsequent steps of claim 1 to effect the recovery of soluble minerals in the ore body by deflecting an initial drill hole horizontally.

3. A process as claimed in claim 1 in which signalling devices are placed in drill holes.

4. A process as claimed in claim 1 in which the position of a second drill hole is located by surveying in the position of the signalling device located in an initial drill hole.

5. A process as claimed in claim 1 in which signalling devices are used to effect the interconnection of drill holes.

6. A process as claimed in claim 1 in which monitoring-while-drilling equipment is employed to locate or assist in guiding the said signalling devices.

7. A process as claimed in claim 1 in which subsequent drill holes are conjoined with the initial drill holes.

8. A process as claimed in claim 1 in which soluble ore is recovered from deep, thick or shallow, thin ore zones.

9. A process as claimed in claim 1 in which a corridor cavity, a triangular cavity, a square cavity or a rectangular cavity is created to effect the recovery of soluble ore.

10. A process as claimed in claim 1 to solution mine from drill holes located at the surface a distance of 2,000 to 5,000 feet or more apart.

11. A process as claimed in claim 1 in which a drill bit and deflecting motor of a different size are attached to the drilling apparatus after the size of the drill hole is reduced by casing.

12. A process as claimed in claim 1 in which drilling apparatus is pulled from a drill hole to attach a signalling device.

13. A process as claimed in claim 1 in which a signalling device is encased in a non-magnetic section of drilling apparatus.

14. A process as claimed in claim 1 in which the direction of fluid in an ore cavity is alternated between two drill holes.

15. A process as claimed in claim 1 in which the fluid level in an ore cavity is adjusted to control the size and shape of the said ore cavity.

16. A process as claimed in claim 1 in which the fluid level in an ore cavity is controlled to improve the quality of the effluent.

17. A process as claimed in claim 1 in which an up-dip drill hole is the influent hole and a down-dip drill hole is the effluent or production hole.

18. A process as claimed in claim 1 in which a signalling device is propelled to the base of a drill hole by using air or water as a circulation medium.

19. A process as claimed in claim 1 in which soluble ore can be recovered from dipping ore zones and/or ore zones at different depths, separately or concurrently.

* * * * *